United States Patent
Chung et al.

(10) Patent No.: US 10,167,800 B1
(45) Date of Patent: Jan. 1, 2019

(54) HARDWARE NODE HAVING A MATRIX VECTOR UNIT WITH BLOCK-FLOATING POINT PROCESSING

(71) Applicant: Microsoft Technology Licensing, LLC, Redmond, WA (US)

(72) Inventors: Eric S. Chung, Woodinville, WA (US); Douglas C. Burger, Bellevue, WA (US); Daniel Lo, Bothell, WA (US); Kalin Ovtcharov, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/680,649

(22) Filed: Aug. 18, 2017

(51) Int. Cl.
*F02D 41/14* (2006.01)
*G05B 23/02* (2006.01)
*F02D 41/28* (2006.01)

(52) U.S. Cl.
CPC ..... *F02D 41/1405* (2013.01); *G05B 23/0221* (2013.01); *G05B 23/0254* (2013.01); *F02D 2041/281* (2013.01)

(58) Field of Classification Search
CPC ............... F02D 41/14; F02D 41/1405; F02D 2041/281; G05B 23/0221; G05B 23/0254
See application file for complete search history.

(56) References Cited

U.S. PATENT DOCUMENTS

| | | |
|---|---|---|
| 7,593,804 B2 | 9/2009 | Grichnik et al. |
| 2009/0024685 A1 | 1/2009 | Salama et al. |
| 2009/0292750 A1 | 11/2009 | Reyzin et al. |
| 2010/0332812 A1 | 12/2010 | Burger et al. |
| 2012/0215826 A1 | 8/2012 | Hansen et al. |
| 2012/0284464 A1 | 11/2012 | Padaki et al. |
| 2017/0061279 A1 | 3/2017 | Yang et al. |

(Continued)

FOREIGN PATENT DOCUMENTS

WO 9201266 A1 1/1992

OTHER PUBLICATIONS

Courbariaux, et al., "Training Deep Neural Networks With Low Precision Multiplications", In Proceedings of 3rd International Conference on Learning Representations, May 7, 2015, pp. 1-10.

(Continued)

*Primary Examiner* — Hieu T. Vo
(74) *Attorney, Agent, or Firm* — Ranjeev Singh; Singh Law, PLLC

(57) ABSTRACT

Processors and methods for neural network processing are provided. A method includes receiving vector data corresponding to a layer of a neural network model, where each of the vector data has a value comprising at least one exponent. The method further includes first processing a first subset of the vector data to determine a first shared exponent for representing values in the first subset of the vector data in a block-floating point format and second processing a second subset of the vector data to determine a second shared exponent for representing values in the second subset of the vector data in a block-floating point format in a manner that no vector data from the second subset of the vector data influences a determination of the first shared exponent and no vector data from the first subset of the vector data influences a determination of the second shared exponent.

20 Claims, 9 Drawing Sheets

(56) References Cited

U.S. PATENT DOCUMENTS

2018/0157465 A1* 6/2018 Bittner .................. G06F 7/483
2018/0174044 A1* 6/2018 Na .......................... G06N 3/08

OTHER PUBLICATIONS

Gupta, et al., "Deep Learning with Limited Numerical Precision", In Proceedings of the 32nd International Conference on Machine Learning, vol. 37, Jul. 6, 2015, pp. 1-10.

Hill, et al., "Rethinking Numerical Representations for Deep Neural Networks", In Proceedings of 5th International Conference on Learning Representations, Apr. 24, 2017, pp. 1-9.

Jiang, et al., "Accuracy evaluation of deep belief networks with fixed-point arithmetic", In Proceedings of Computer Modelling & New Technologies, vol. 18, Issue 6, 2014, pp. 7-14.

Nash, J. Greg, "Floating-point FFT with Minimal Hardware", Aug. 13, 2015, 5 pages.

"Choosing the Right DSP Processor", Jun. 12, 2017, 42 pages.

Dou, et al., "64-bit floating-point FPGA matrix multiplication", In Proceedings of the ACM/SIGNDA 13th International Symposium on Field-Programmable Gate Arrays, Feb. 20, 2005, pp. 86-95.

Amant, et al., "Low-Power, High-Performance Analog Neural Branch Prediction", In Proceeding sof the 41st Annual IEEE/ACM International Symposium on Microarchitecture, Feb. 2008, 12 pages.

Amant, et al., "General-Purpose Code Acceleration with Limited-Precision Analog Computation", In Proceedings of the 41st International Symposium on Computer Architecture, 2014, 12 pages.

"Block floating-point", From Wikipedia—the free encyclopedia, 2017, 1 page.

Chhabra, et al., "A Block Floating Point Implementation on the TMS320C54x DSP", Retrieved From: http://www.ti.com/lit/an/spra610/spra610.pdf, Dec. 1, 1999, 74 Pages.

"International Search Report & Written Opinion Issued in PCT Patent Application No. PCT/US18/038863", dated Oct. 17, 2018, 12 Pages.

* cited by examiner

HARDWARE NODE HAVING A MATRIX VECTOR UNIT WITH BLOCK-FLOATING POINT PROCESSING

BACKGROUND

Neural network technology is used to perform complex tasks such as reading comprehension, language translation, or speech recognition. Many of these tasks include deep learning that involves performing large numbers of floating point matrix multiply and accumulate operations. These operations are performed during training as well as during serving of results based on the input data and the trained vector data.

SUMMARY

In one example, the present disclosure relates to a method in a processor including a matrix vector unit. In one example, the method may include receiving vector data corresponding to at least one layer of a neural network model for processing using the matrix vector unit, where each of the vector data has a value represented in a format comprising at least one exponent. The method may further include first processing a first subset of the vector data to determine a first shared exponent for representing values in the first subset of the vector data in a block-floating point format and second processing a second subset of the vector data to determine a second shared exponent for representing values in the second subset of the vector data in a block-floating point format, where the first processing and the second processing is performed to determine the first shared exponent and the second shared exponent in a manner that no vector data from the second subset of the vector data influences a determination of the first shared exponent and no vector data from the first subset of the vector data influences a determination of the second shared exponent.

In another example, the present disclosure relates to a processor configured to receive vector data corresponding to at least one layer of a neural network model for processing using the matrix vector unit, where each of the vector data has a value represented in a format comprising at least one exponent. The processor is further configured to first process a first subset of the vector data to determine a first shared exponent for representing values in the first subset of the vector data in a block-floating point format and second process a second subset of the vector data to determine a second shared exponent for representing values in the second subset of the vector data in a block-floating point format, where the processor is further configured to determine the first shared exponent and the second shared exponent in a manner that no vector data from the second subset of the vector data influences a determination of the first shared exponent and no vector data from the first subset of the vector data influences a determination of the second shared exponent.

In yet another example, the present disclosure relates to a system including an input message processor configured to process incoming messages, where the input message processor is further configured to split the incoming messages into a first set of messages and a second set of messages. The system may further include a scalar processor configured to process the first set of messages. The system may further include a neural function unit configured to process instructions placed in a plurality of queues by the scalar processor on input data received at least via the second set of messages. The neural function unit may include a pipeline configured to process instructions, the pipeline including a matrix vector unit, a first multifunction unit, where the first multifunction unit is connected to receive an input from the matrix vector unit, a second multifunction unit, where the second multifunction unit is connected to receive an output from the first multifunction unit, and a third multifunction unit, where the third multifunction unit is connected to receive an output from the second multifunction unit. The matrix vector unit may be configured to receive training vector data corresponding to at least one layer of a neural network model for processing using the matrix vector unit, where each of the training vector data has a value represented in a format comprising at least one exponent. The matrix vector unit may further be configured to first process a first subset of the training vector data to determine a first shared exponent for representing values in the first subset of the training vector data in a block-floating point format and second process a second subset of the training vector data to determine a second shared exponent for representing values in the second subset of the training vector data in a block-floating point format, where the processor is further configured to determine the first shared exponent and the second shared exponent in a manner that no vector data from the second subset of the training vector data influences a determination of the first shared exponent and no vector data from the first subset of the training vector data influences a determination of the second shared exponent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
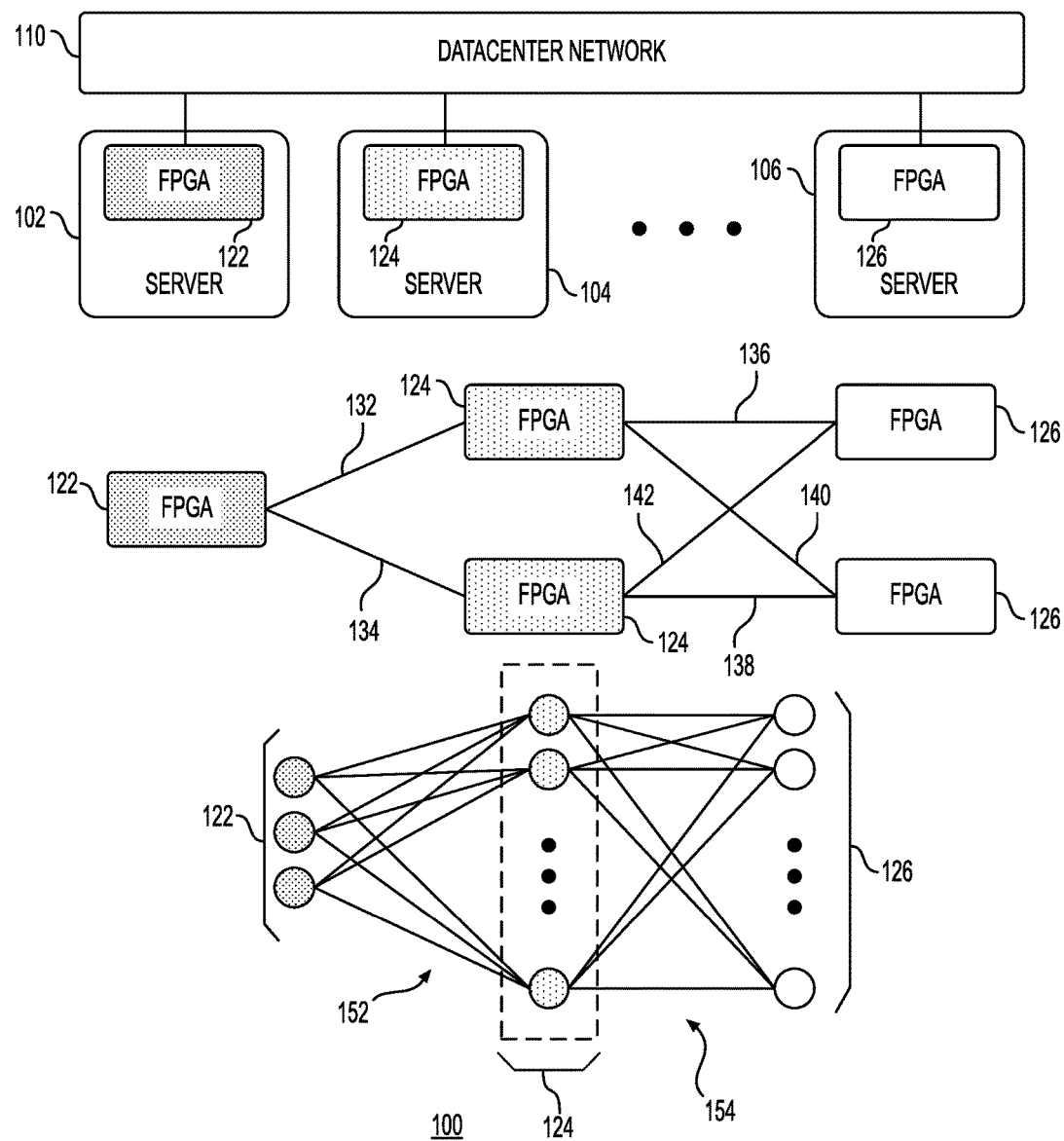
FIG. 1 is a block diagram of a system including nodes interconnected via a datacenter network in accordance with one example.

Examples disclosed in the present disclosure relate to using system, methods, and components for implementing neural network based processing. Certain examples relate to Deep Neural Networks (DNNs). A DNN may be any suitable neural network for deep learning. Additional examples in this disclosure relate to functional units included as part of the nodes used to implement a DNN or a similar neural network. Nodes may be implemented using portions or combinations of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. Nodes may also be implemented using a CPU, a GPU, a combination of CPUs and GPUs, or a combination of any of the programmable hardware, CPUs, and GPUs. An image file may be used to configure or re-configure nodes such as FPGAs. The image file or similar file or program may be delivered via a network link or a local link (e.g., PCIe) from a host CPU. Information included in an image file can be used to program hardware blocks of a node (e.g., logic blocks and reconfigurable interconnects of an FPGA) to implement desired functionality. Desired functionality can be implemented to support any service that can be offered via a combination of computing, networking, and storage resources, such as via a data center or other infrastructure for delivering a service.

In one example, the present disclosure relates to a DNN comprising multiple nodes (e.g., FPGAs) or groups of such nodes coupled to each other via a low latency network. A converged platform leveraging hundreds to thousands of such nodes (e.g., FPGAs) may advantageously offer: (1) significantly reduced training times from exploiting parallelism across hundreds of thousands of nodes, (2) enabling new training scenarios such as online learning in-situ on live data, and (3) training models of unprecedented scale while leveraging flexible and fungible homogeneous FPGA resources in a hyper-scale datacenter spanning hundreds of thousands of servers. In one example, such advantages may be obtained by exploiting unconventional data representations that may leverage the architecture of nodes, such as FPGAs.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Long Short Term Memory (LSTM) neural networks, or Gated Recurrent Units (GRUs) may be implemented using the systems and nodes described in this disclosure. In one example, the service-related content or other information such as words, sentences, images, videos, or other such content/information may be translated into a vector representation. The vector representation may correspond to techniques such as RNN, LSTM, or GRU. The deep learning models may be trained off-line before service initialization and then may be deployed using the systems and nodes described in this disclosure. The nodes may be hardware programmable logic devices that could be customized specifically to perform the types of operations that occur in the context of neural networks, such as DNNs. In one example, the state of a neural network model and the parameters used to control the model may be pinned to the on-chip memories of the nodes comprising a distributed hardware platform. The neural network model may be pinned (e.g., preloaded) to the on-chip memories at the service start up time and the contents of the on-chip memories may not be altered unless the model requires alteration or another event that requires reloading the on-chip memories with the model. Thus, in this example, contrary to other arrangements, neural network model may not be accessed from the DRAM associated with the hardware platform, and instead, be loaded directly into the on-chip memories (e.g., SRAMs) of the hardware node. Pinning a model across a distributed set of programmable logic blocks (e.g., FPGA resources) may allow the nodes (e.g., FPGAs) operating at full capacity and that may advantageously improve the throughput and the latency associated with the service. As an example, even a single request from the service may result in the distributed set of nodes to operate at full capacity and thereby delivering results requested by a user of the service at very low latency.

In one example, the neural network model may comprise of many layers and each layer may be encoded as matrices or vectors of weights expressed in the form of coefficients or constants that have been obtained via off-line training of a neural network. Programmable hardware logic blocks in the nodes may process the matrices or vectors to perform various operations, including multiply, add, and other operations against input vectors representing encoded information related to the service. In one example, the matrices or vectors of weights may be partitioned and pinned across multiple nodes by using techniques such as graph partitioning. As part of this process, a large neural network may be translated into an intermediate representation (e.g., a graph) and then the intermediate representation may be carved into smaller representations (e.g., sub-graphs) and each of the matrices of weights corresponding to each sub-graph may be pinned to a node's on-chip memories. In one example, the models may be translated into fixed-size matrices and vectors. This way, the nodes' resources may operate on the fixed-size matrices and vectors in parallel.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

In this example, inside each LSTM layer the inputs and hidden states may be processed using a combination of vector operations (e.g., dot-product, inner product, or vector addition) and non-linear functions (e.g., sigmoids, hyperbolic and tangents). In certain cases, the most compute intensive operations may arise from the dot products, which may be implemented using dense matrix-vector and matrix-matrix multiplication routines. In one example, the processing of the vector operations and non-linear functions may be performed in parallel.

Values corresponding to the training vector data, including vector data, may be represented in a number format. Floating point representation for the values of the vector data is expensive because each individual point value has an exponent specific to that point value. The alternative may be a fixed point representation. A single fixed point representation of values across the entire hardware node used for neural network processing may have several limitations. First, each of the various independent neural network models may require a different fixed point position, and that may in turn require multiple configurations of the hardware nodes. Second, attempting to adequately express every value across an entire neural network model evaluation in a single fixed point representation may dramatically drive up the number of bits required for that representation. Indeed, for certain types of DNNs that do not normalize their values between layers (e.g. with a sigmoid), a static fixed point representation may be completely infeasible. In one example, this disclosure relates to using two number formats: floating point and block-floating point (BFP) to extend the dynamic range of numbers represented within the hardware node. In one example, the hardware node may use traditional floating point representations whenever possible, including its network interfaces and vector-vector operators. The matrix-vector multiplier may use integer arithmetic, however, in the form of block floating point techniques for expanded dynamic range. This may advantageously result in a processor that communicates with the outside world in floating point and transparently implements internal integer arithmetic when necessary.

In one example, fixed point representation may use a set number of integer bits and fractional bits to express numbers. Fixed point can be efficiently processed in hardware with integer arithmetic, which may make it a preferred format when applicable. Fixed point format may be represented as qX·Y, where X is the number of integer bits and Y is the number of fractional bits. Block-floating point (BFP) may apply a shared exponent to a block of fixed point numbers, for example a vector or matrix. The shared exponent may allow a significantly higher dynamic range for the block, although individual block members have a fixed range with respect to each other. For example, BFP can express an entire block of very large numbers accurately; however, a block that contains both very small and very large numbers would not be expressed accurately. Identifying a reasonable value for the shared exponent may involve two passes over the block, first to scan the entire block to determine the exponent, then a second pass to align all values to the exponent. Advantageously, individual members of the block can be operated on with integer arithmetic. Moreover, the shared exponent for each block is determined independently, which may advantageously allow for a higher dynamic range.

FIG. 1 is a block diagram of a system 100 including nodes interconnected via a datacenter network 110 in accordance with one example. For example, as shown in FIG. 1, multiple nodes 102, 104, and 106 may be coupled via the datacenter network. Such nodes may be instantiated and used to parallelize multiple layers of a neural network, such as an LSTM network. In one example, each node may be implemented as a server and may further include at least one hardware node (e.g., an FPGA.) Thus, node 102 may include FPGA 122, node 104 may include FPGA 124, and node 106 may include FPGA 126. The FPGAs may be interconnected via a light transport layer protocol based system. In one example, a first instance of FPGA 122 may be coupled via a transport link 132 with a first instance of FPGA 124 and the first instance of FPGA 122 may further be coupled via transport link 134 with the second instance of FPGA 124. The first instance of FPGA 124 may be coupled via a transport link 136 with a first instance of FPGA 126 and the first instance of FPGA 124 may further be coupled via transport link 140 with a second instance of FPGA 126. Similarly, the second instance of FPGA 124 may be coupled via a transport link 142 with the first instance of FPGA 126 and the second instance of FPGA 124 may further be coupled via a transport link 138 with the second instance of FPGA 126. The light transport layer protocol may provide the FPGAs with the ability to transfer or receive packets or other such data from each other via datacenter network 110. The FPGAs may be interconnected in other configurations as well. For example, several instances of FPGA 122 may be coupled via multiple transport links 152 to several instances of FPGA 124. Similarly, several instances of FPGA 124 may be coupled via transport links 154 to several instances of FPGA 126. Although FIG. 1 shows a certain number and arrangement of nodes, including FPGAs, there could be more or fewer number of nodes arranged differently.

Figure 2:
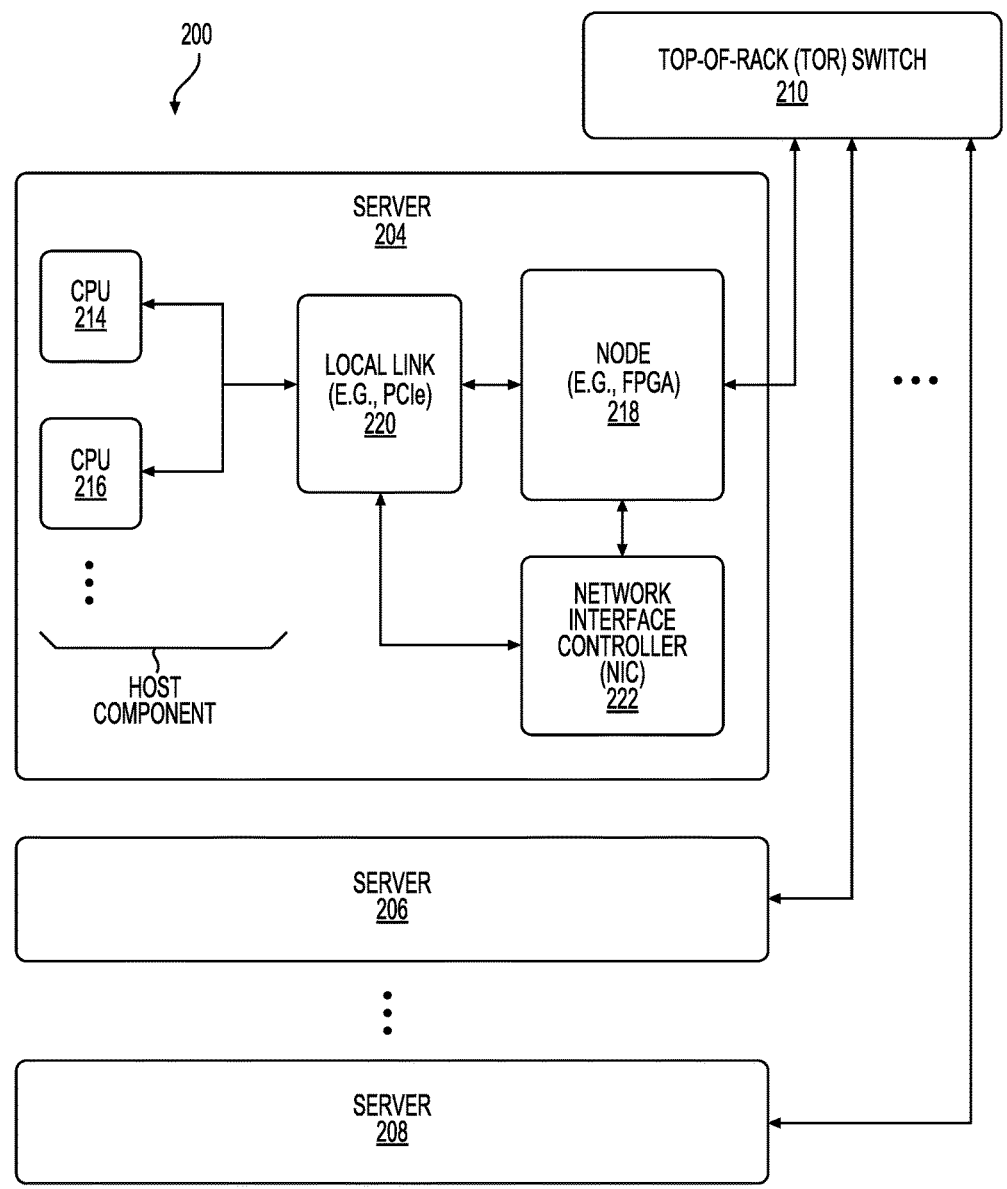
FIG. 2 is a block diagram of a system including distributed nodes in accordance with one example.

FIG. 2 is a block diagram of a system 200 including distributed nodes in accordance with one example. In this example, the multiple nodes may be implemented as a rack of servers in a datacenter. Each of the servers can be coupled to a top-of-rack (TOR) switch. Other racks, although not shown, may have a similar configuration. Each server may include at least one node or multiple nodes. Each node may include a server (e.g., sever 204, sever 206, or server 208) and each server may be coupled to a TOR switch (e.g., TOR switch 210). Server 204 may include a host component including CPUs, such as CPU 214 and CPU 216, which may be coupled via a local link (e.g., PCIe) 220 to a hardware node, e.g., FPGA 218. Each hardware node may also be coupled by way of a network interface controller 222 (e.g., used to communicate across the network infrastructure for the data center). The system shown in FIG. 2 may allow nodes to perform processing on messages that are received from (and/or sent to) TOR switch or other switches. Using this example system, individual nodes may send messages comprising packets directly to each other and thus this may allow the partitioning of even a single neural network across multiple FPGAs without incurring unacceptable latencies. For communicating the nodes may use a lightweight protocol, including, for example, RDMA. Although FIG. 2 shows a certain number of components of the system arranged in a certain manner, there could be more or fewer number of components arranged differently.

Parallelization could also be performed within a layer of a neural network by splitting neural weights across multiple nodes. As an example, a single RNN model (e.g., including LSTM weight matrices) may be partitioned and pinned across multiple nodes. In an implementation of this example, an RNN model may be distributed across the memories (e.g., BRAMs) of each of multiple FPGAs. In this example configuration, each individual FPGA in a multi-stage pipeline may store a fraction of the LSTM weight matrices in a fast on-chip memory (e.g., BRAM). This may advantageously result in a high throughput and yet a low-latency system. At the service start up, the LSTM weight matrices may be decomposed into certain size matrices (e.g., an N by M matrix, where each of N and M is an integer equal to or greater than 8) and then be loaded into the on-chip memories of the FPGAs. A run-time management layer may enable allocation, scheduling, and management of the FPGAs. In one example, each node may be implemented as a HaaS-attached LSTM-focused vector processor based on one or more FPGAs. Each node may be designed to run neural network evaluations as either as a PCIe-attached FPGA or as part of a HaaS pool of FPGAs.

Figure 3:
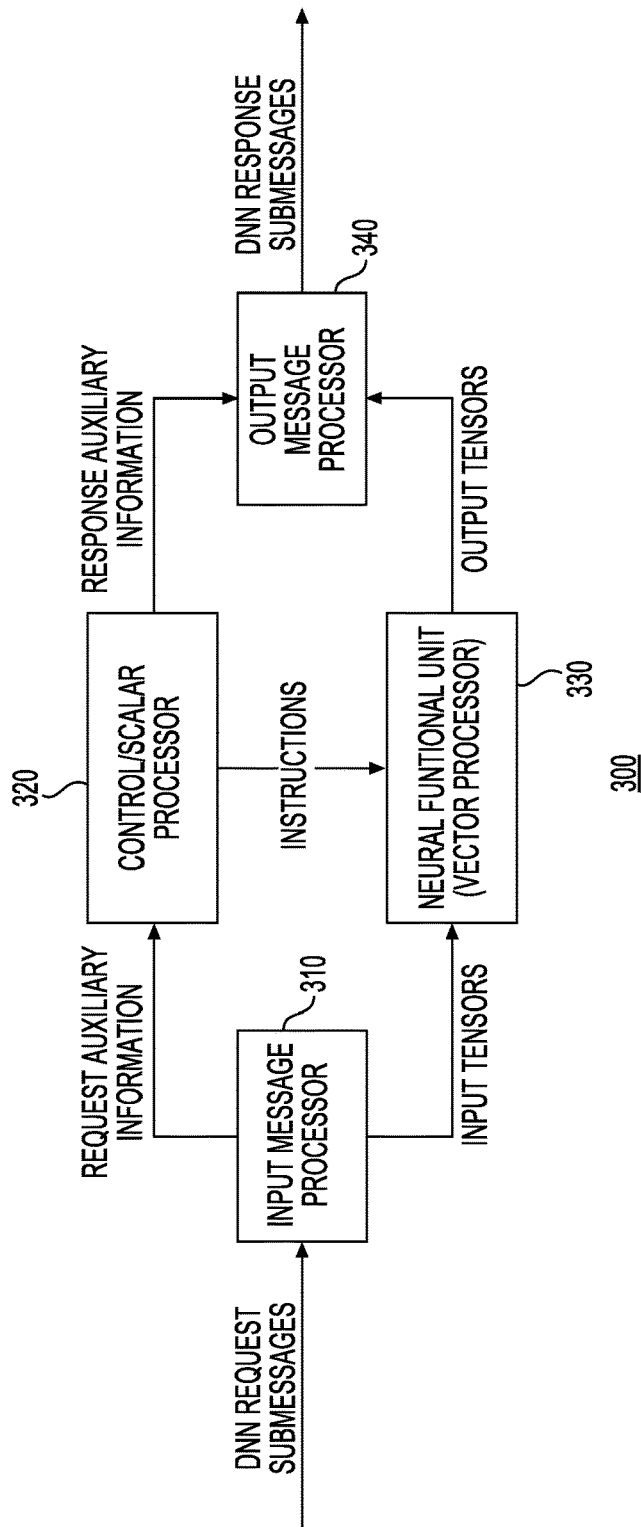
FIG. 3 is a block diagram of a hardware node in accordance with one example.

FIG. 3 is a block diagram of a hardware node 300 in accordance with one example. Each hardware node 300 may include an Input Message Processor (IMP) 310 for receiving messages from other nodes and an Output Message Processor (OMP) 340 for processing outgoing messages to other nodes or components. Each node may further include control/scalar processor (CSP) 320 and a neural functional unit (NFU) 330. Although not shown, the messages received by a node may be stored in at least two different queues: (1) IMP-to-CSP Auxiliary Queue and (2) IMP-to-NFU Data Queue. Although not shown, the outgoing messages may be stored in at least two different queues: (1) CSP-to-IMP Auxiliary Queue and (2) NFU-to-OMP Data Queue. In this example, the node may accept off-chip messages containing both auxiliary information such as control and scalar data and payload data (e.g., vectors, matrices, or other tensor data structures). The auxiliary information may include a request to perform computationally intensive operations on the payload, and then return a result in the form of an output message. In this example, the incoming messages are handled by a lightweight input message processor (IMP) 310, which sends auxiliary information to control/scalar processor (CSP) 320 (which may be an NIOS-based control processor) and payload data (e.g., input tensors) to neural functional unit (NFU) 330, which may be implemented as a matrix-vector processor. As an example, CSP 320 may then interpret the request, and based on its firmware, may send a series of instructions to NFU 330. After a certain processing latency, the NFU may produce the result of the request, which may be combined with auxiliary data produced by CSP 320 in a lightweight output message processor (OMP) 340 and then sent off-chip. CSP firmware may provide instructions to NFU 330. Further details of the example instructions are discussed as part of the instruction set architecture (ISA). Run-time reloading of the firmware for CSP 320 may also be performed. Thus, in this example, the architecture is largely event driven. The input messages may arrive from many sources (including over the network). IMP may examine the head of the queue of the messages and it can dequeue any instructions that need to be performed and feed it through the system. Although FIG. 3 shows a certain number of components of the example node arranged in a certain manner, there could be more or fewer number of components arranged differently.

In one example, the NFU may be implemented as a matrix-vector processor designed to scale up to the majority of the FPGA's resources. In this example, the primary hardware acceleration goal of the NFU is to perform matrix-vector multiplications at high throughput and low latency with its matrix-vector unit (MVU) by applying thousands of multiply-adders. The NFU may receive matrices of coefficients (e.g., constants) and may be used for multiplying these coefficients with the dynamic input vector data. Thus, instead of storing the coefficients in a DRAM corresponding to a CPU/GPU, the coefficients may be pre-loaded at the service startup time into the on-chip memories (e.g., block random access memories (BRAMs) of FPGAs) corresponding to the NFU. In one example, the coefficients once loaded may never be re-loaded again unless the neural network model being used is modified or the service is restarted. In other words, as part of this example, the model may be partitioned and pinned in a distributed manner to the on-chip memories of multiple nodes (e.g., FPGAs) connected in a manner that they can transfer messages or packets to each other directly without relying upon assistance from CPU resources.

In one example, the MVU may be fully pipelined and may be capable of performing an $O(n^2)$ complexity matrix-vector multiplication in $O(n)$ time, at a performance of 400-1800 billion fixed point operations per second. While matrix-vector multiplications may represent the vast majority of the fixed point operations required to evaluate an LSTM layer, the evaluation can also contain a variety of vector reductions, transcendentals, and the addition of bias vectors. The NFU may also implement pipelined multifunction units (MFUs) to handle these $O(n)$ complexity vector functions in $O(n)$ time. These MFUs may be organized into a chain architecture, with the MVU passing data to the first MFU, the first MFU passing data to the second MFU, and so on. In one example implementation of the NFU, 1 MVU and 5 MFUs may be used.

The chain architecture may allow the NFU to exploit massive pipeline parallelism between a single matrix-vector multiplication and several vector functions, based on the observation that vector functions could potentially dominate LSTM evaluation time in an architecture where vector and matrix-vector operations take approximately the same amount of time to compute. The NFU's memory subsystem may also be configured to support high throughput. As an example, the memory subsystem may support up to 1.8 TB/s of matrix value throughput along with support for loading 6 vectors and storing 6 vectors simultaneously.

Figure 4:
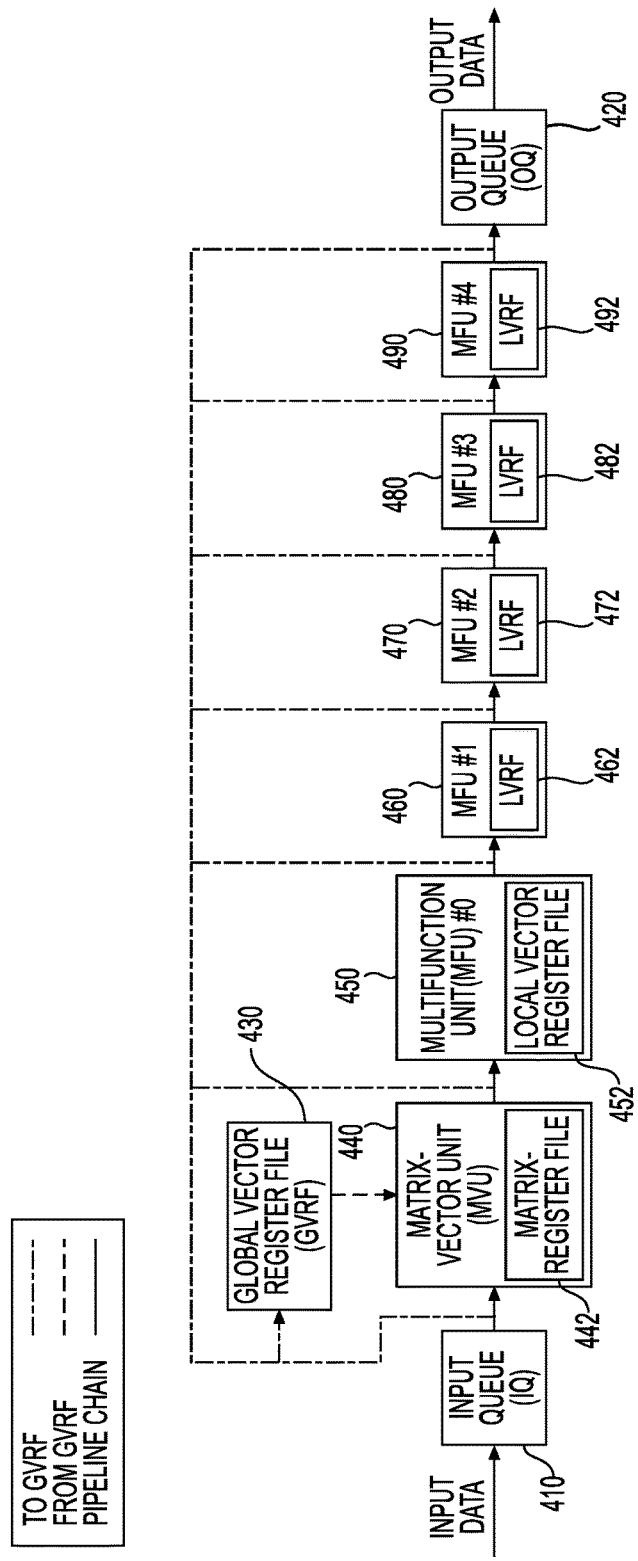
FIG. 4 is a block diagram of a neural functional unit in accordance with one example.

FIG. 4 shows an example implementation of an NFU 400. NFU 400 may include an INPUT QUEUE (IQ) 410 for receiving input data and OUTPUT QUEUE (OQ) 420 for outputting output data. Thus, NFU 400 can bring external vector and matrix data in through its INPUT QUEUE (IQ) 410 and emit vector data through its OUTPUT QUEUE (OQ) 420. NFU 400 may include a GLOBAL VECTOR REGISTER FILE (GVRF) 430 for providing a centralized location that may be used to store vector data. NFU 400 may include a MATRIX-VECTOR UNIT (MVU) 440 and five MULTIFUNCTION UNITs (MFUs) (e.g., MFU #0 450, MFU #1 460, MFU #2 470, MFU #3 480, and MFU #4 490, as shown in FIG. 4). MVU 440 may include a MATRIX-REGISTER FILE 442 for storing matrices that may be pre-loaded at the time of starting a service that is being supported by the node. Each MFU may also include a LOCAL VECTOR REGISTER FILE (LVRF) 452 for storing local vector data for the corresponding MFU (e.g., LVRF 452, LVRF 462, LVRF 472, LVRF 482, and LVRF 492). The instructions may be executed by NFU 400 in order. A series of instructions may be configured such that the pipeline (including, e.g., the one MVU 440 and the five MFUs) executes the chain of instructions in parallel. As an example, input vector data may be multiplied using a matrix operation using MVU 440 and then it may be passed to the OUTPUT QUEUE 420 through the pipeline. The various data flow possibilities in NFU 400 are shown via the two dotted paths and one solid path in FIG. 4.

The example NFU 400 may operate on vectors and matrices. A vector is a 1D set of scalar elements, and a matrix is a 2D set of scalar elements. The size of an element, vector, and matrix may be set using the parameter in Table 1 below.

TABLE 1

Element: Scalar value represented by ELEM_WIDTH bits
Vector: 1D set of elements with length HWVEC_ELEMS
Matrix: 2D set of elements with dimensions HWVEC_ELEMS x HWVEC_ELEMS
Lanes: Elements processed in parallel per cycle by most NFU sub-modules
Size of a vector in bits = HWVEC_ ELEMS * ELEM_WIDTH
Size of a matrix in bits = HWVEC_ ELEMS 2 * ELEM_WIDTH
Width of all NFU data busses in bits = LANES * ELEM_WIDTH
Cycles to transmit a vector over a data bus = HWVEC_ ELEMS /LANES
Cycles to transmit a matrix over a data bus = HWVEC_ ELEMS 2/LANES Certain parameters (e.g., as shown in Table 1) may be used to configure NFU 400 at the design time or later. In one example, four parameters may be used to configure NFU 400. The first parameter may be the data type of the matrix and vector elements, especially the width of a single element (ELEM_WIDTH). As an example, 8-bit fixed point data type, 16-bit fixed point data type, 27-bit fixed point data type, and 32-bit floating point data types may be the set of data types in one example. The width of each data bus in NFU 400 may be configured to be ELEM_WIDTH*LANES bits; each vector may use ELEM_WIDTH*HWVEC_ELEMS bits in memory; and each matrix may use ELEM_WIDTH*HWVEC_ELEMS*HWVEC_ELEMS bits in memory.

The second parameter may be the hardware vector size (HWVEC_ELEMS). In one example, all vectors stored within NFU 400 may have a fixed number of elements equal to HWVEC_ELEMS, and all vector instructions may accept HWVEC_ELEMS elements as input and/or produce HWVEC_ELEMS elements as output. Furthermore, all matrices may have a fixed number of elements equal to HWVEC_ELEMS.

Many applications may have their own algorithmic dimensions that may differ from the hardware vector size. When this is the case, the programmer (or the compiler) may map high-level operations to the hardware vector size using techniques such as matrix blocking. As an example, Table 2 below shows an application that has 500×500 matrix size and a 500-element vector size; however, the hardware vector size of NFU 400 is 250. The function shown in Table 2 may be used for addressing this difference.

TABLE 2

//algorithmic dimension: 500 x 500 matrix, 500-element vector
//hardware vector size = 250
Function matrix-vector_multiply_500 x 500: input matrix_500 x 500 m, vector_500 iv; output vector_500 ov
  //Blocked matrix-vector multiplication (additions are pointwise vector additions)
  ov[0. . . 249] = mv_mul(m[0. . . 249][0. . . 249], iv[0. . . 249]) + m[0. . . 249][250. . . 499], iv[250. . . 499])
  ov[250. . . 499] = mv_mul(m[250. . . 499][0. . . 249], iv[0. . . 249]) + mv_mul(m[250. . . 499][250. . . 499], iv[250. . . 499])

The third parameter may be the number of vector lanes (LANES), which describes how many elements should be operated on in parallel within each MFU. As an example, the number of parallel operations within the matrix-vector unit (MVU) 440 may be defined as LANES*HWVEC_ELEMS assuming there are HWVEC_ELEMS tiles with LANES multiply-adders each. The tiles are described further as part of the description corresponding to an example matrix-vector unit (MVU) 440. Furthermore, every NFU data bus, including the top-level ports, may carry LANES vector elements per cycle for a total width of LANES*ELEM_WIDTH bits. In one example, LANES is an integer factor of HWVEC_ELEMS to avoid bit padding, since vectors are operated on in LANES-sized chunks and it takes HWVEC_ELEMS/LANES cycles to process a vector.

The fourth parameter may be the size of the matrix register file (NRF_SIZE), which stores a given number of HWVEC_ELEMS×HWVEC_ELEMS matrices in an on-chip memory corresponding to the NFU (e.g., fast on-chip BRAM (see description later). In one example, the memory resources needed on a node (e.g., the number of BRAM resources on an FPGA) may be derived through the set of formulas below (note that ceil(x,y) rounds x up to the nearest multiple of y):

$$BRAM_{width} = \text{ceil}(LANES * DATA\_WIDTH, 40)$$

$$BRAM_{depth} = \text{ceil}\left(\frac{20480}{BRAM_{width}}, 512\right)$$

$$BRAMs = \text{ceil}\left(\frac{MRF\_SIZE * HWVEC\_SIZE * DATA\_WIDTH}{BRAM_{WIDTH} * BRAM_{DEPTH}}, 1\right) * HWVEC\_SIZE$$

$$\frac{M20Ks}{BRAM} = \frac{BRAM_{width}}{40} * \frac{BRAM_{depth}}{512}$$

$$M20Ks = \frac{M20Ks}{BRAM} * BRAMs$$

With respect to the memory subsystem, NFU 400 may distribute its internal storage across three main types of memories. First, a matrix register file may be used to store MRF_SIZE HWVEC_ELEMS×HWVECS_ELEMS matrices in a series of fast on-chip random access memories (e.g., BRAMs in an FPGA). These BRAMs may be distributed throughout the matrix vector unit and can each supply LANES matrix elements per cycle, for a total on-chip matrix throughput of HWVEC_ELEMS*LANES*ELEM_WIDTH bits/cycle. In this example, it may take $O(HWVEC\_ELEMS^2)$ cycles to store a matrix into the matrix register file; as such matrix stores may be performed in a preload step and then amortized against many matrix-vector multiplications.

Next, as shown in FIG. 4, global vector register file (GVRF) 430 may be used to act as a centralized location that programmers can use to store vector data. One example configuration for the GVRF can store 32 vectors, and can read LANES vector elements per cycle while also writing LANES vector elements per cycle. Furthermore, each multifunction unit in the NFU may have its own local vector register file (LVRF) that can also read and write LANES vector elements per cycle. Therefore, in an example NFU with 5 MFUs, the total vector memory bandwidth is 6*LANES reads and 6*LANES writes per cycle of 12 separate vectors. This vector memory architecture is configured to support chaining several vector functions together, one of which can read from the GVRF, each of which can read and write to one LVRF, and one of which can write back to the GVRF.

The NFU's matrix-vector unit (MVU) 440 may perform pipelined high-throughput low-latency matrix-vector multiplications. In one example, the MVU 440 uses LANES*HWVEC_ELEMS multipliers and adders to accomplish this goal, and its throughput can be measured as 2*LANES*HWVEC_ELEMS*fmax operations per second. In one example, unlike typical high-throughput matrix-vector multipliers, which rely on vector batching, the MVU 440 accepts one vector at a time into its pipeline.

Figure 5:
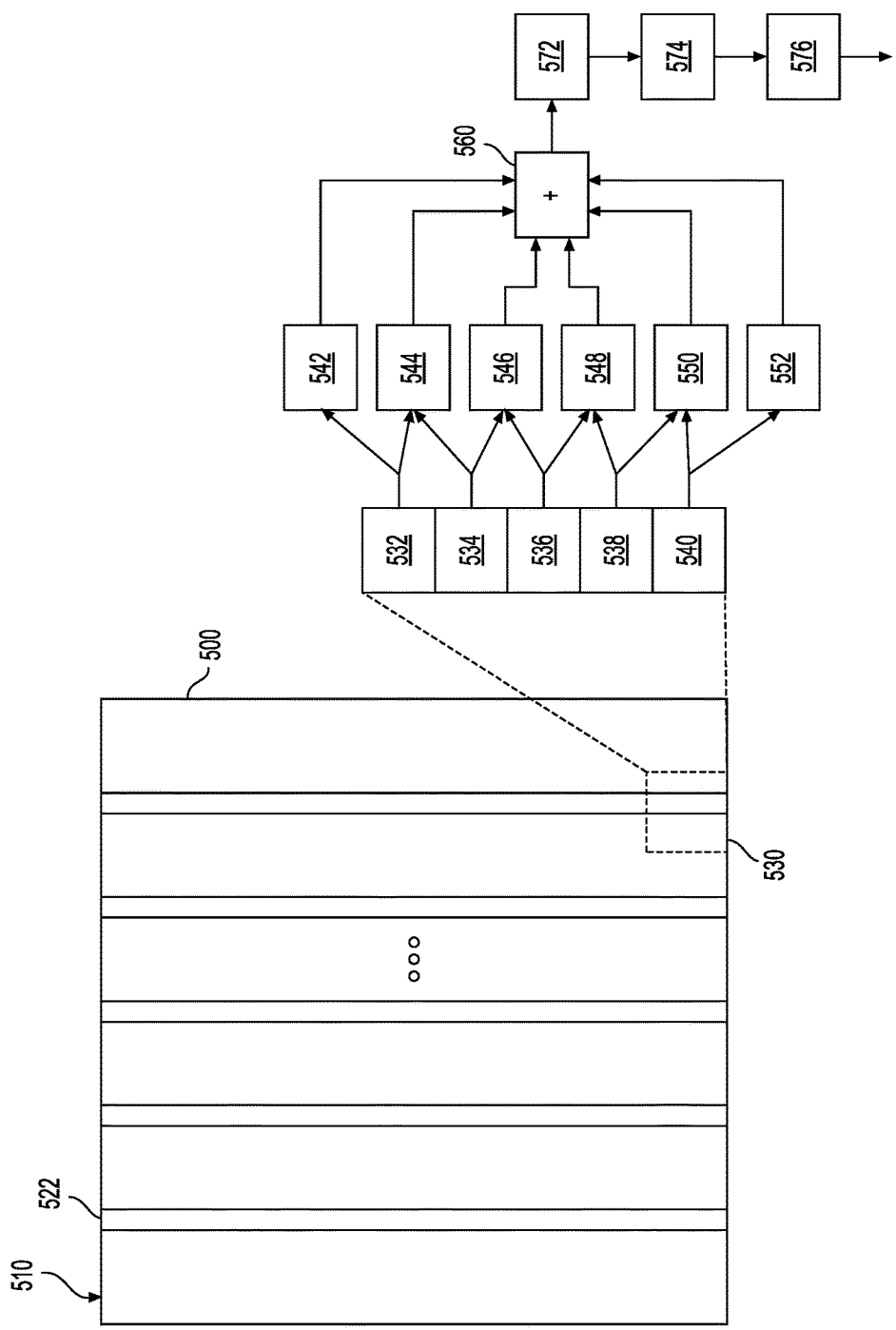
FIG. 5 shows a block diagram of a hardware node (e.g., an FPGA) for performing neural network processing in accordance with one example.

FIG. 5 shows a block diagram of a hardware node (e.g., an FPGA) 500 for performing neural network processing in accordance with one example. Hardware node 500 may include columns of memory elements (e.g., block RAMs) 510 and processing logic blocks (e.g., digital signal processors (DSPs)) 522. A small set of BRAMs and DSPs may be configured to create a processing tile, for example, processing tile 530. In the example in FIG. 5, each tile (e.g., processing tile 530) may include BRAMs 532, 534, 536, 538, and 540, which may be arranged as shown. Each processing tile 530 may further include processing logic blocks (e.g., digital signal processors (DSPs)) 542, 544, 546, 548, 550, and 552, which may be arranged as shown in FIG. 5. Processing logic blocks may be used to multiply an input vector with a row of weights. The output of processing logic blocks may be added using adder 560. Thus, in this example, each tile may perform a point-wise dot product operation. Although FIG. 5 shows a certain number of components of hardware node 500 arranged in a certain manner, there could be more or fewer number of components arranged differently.

Figure 6:
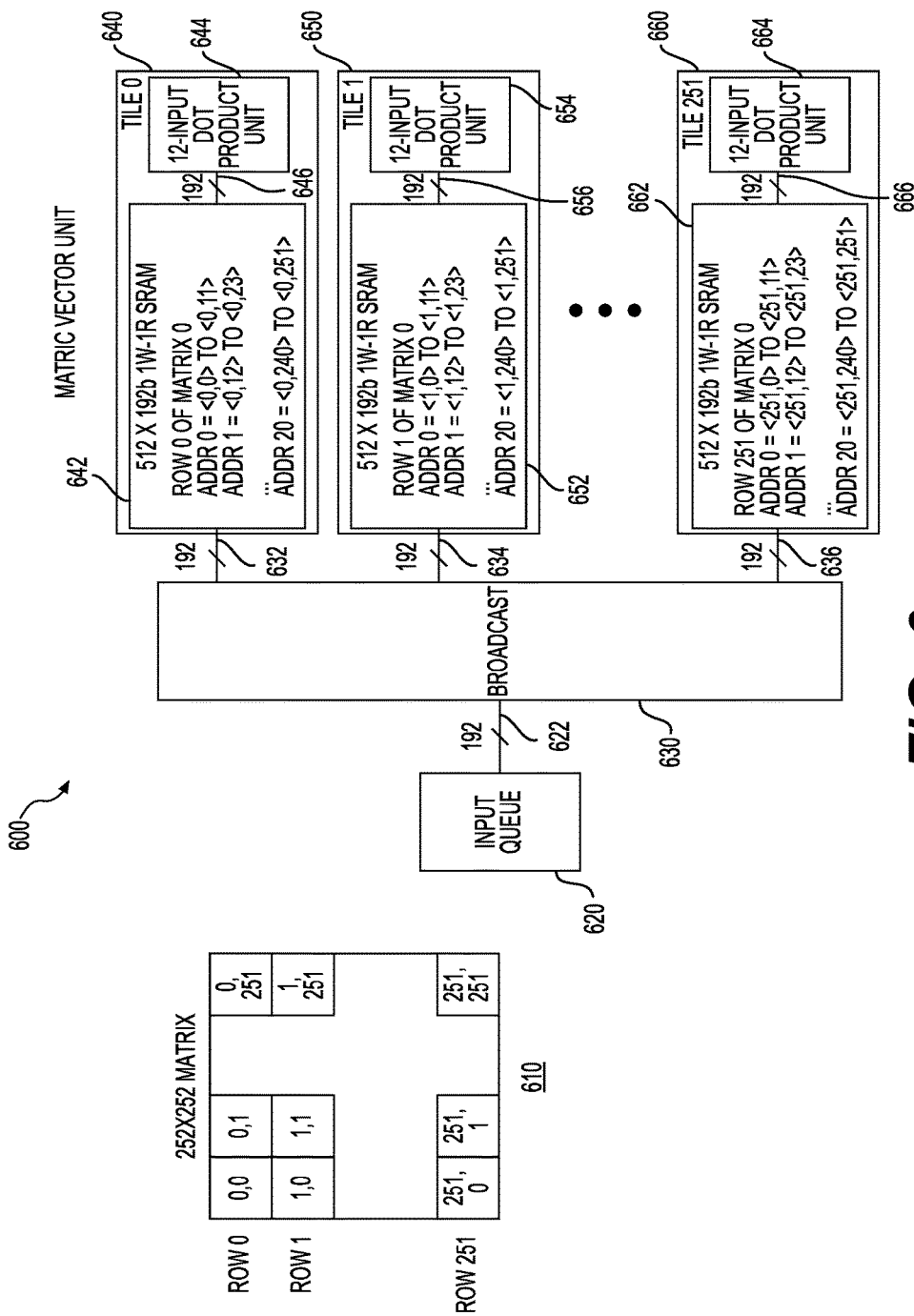
FIG. 6 shows an example implementation of a node including a matrix of tiles.

FIG. 6 shows an example implementation of a node 600 including a matrix of tiles. In this example implementation, a 252×252 matrix 610 of data is processed using a node 600 that has 252 tiles. Example node 600 may receive data via Input Queue 620, which may be coupled to a BROADCAST block 630 using a bus 622. In this example, the bus width of bus 622 may be 192 bits. BROADCAST block 630 may be coupled via individual buses to SRAM blocks to allow the quick loading of the pre-trained neural network model into node 600. FIG. 6, as an example, shows TILE 0 640, TILE 1 650, and TILE 251 660. TILE 0 640 may be coupled via a 192-bit bus 632 to BROADCAST block 630. TILE 1 650 may be coupled via a 192-bit bus 634 to BROADCAST block 630. TILE 251 660 may be coupled via a 192-bit bus 636 to BROADCAST block 630. Each tile may include a corresponding SRAM and a dot product unit. As an example, TILE 0 640 may include SRAM 642 and dot product unit 644, which may be coupled to each other using a 192-bit bus 646. TILE 1 650 may include SRAM 652 and dot product unit 654, which may be coupled to each other using a 192-bit bus 656. TILE 251 660 may include SRAM 662 and dot product unit 664, which may be coupled to each other using a 192-bit bus 666. Each SRAM may store one row of a matrix of weights, which may be stored based on the addressing scheme shown in FIG. 6. Each dot product unit may be implemented as a 12-INPUT dot product unit. At service startup, the pre-trained neural network model weights may be streamed into the on-chip memories of an FPGA (e.g., the SRAMs in FIG. 6) and pinned into specific arrangements allowing the compute units to generate output at a very high throughput. In one example, each row of the matrix may represent a neuron and each column entry in the row may represent the synaptic weight that is attached to that neuron. The coefficients stored in a matrix form (representing the neuron, for example) may be preloaded into the SRAMs or other memory associated with the hardware node. In an instance where the neurons do not fit on a single hardware node (e.g., an FPGA), a portion of the neurons may be loaded into a second hardware node and so on. In one example, the neural weight matrices may be distributed using graph partitioning techniques. A graph representing the neural weight matrices may be split into subgraphs, which could be then pinned into the memories of the different hardware nodes, which could communicate with each other using a lightweight transport protocol or other types of protocols. Hardware nodes may communicate directly with each other, for example, using the architecture and systems described via FIGS. 1 and 2.

This example shows an architecture built using an FPGA that operates on fixed-size matrices and vectors. In this example, the native size that is supported is 252 by 252 square matrices. In other parameterized instances of these designs other shapes and sizes of matrices may be used. In this example, there are 24 square matrices that can be stored into the on-chip memories (e.g., the SRAMs). Thus, in this example there is an array of 252 tiles, and each tile is a compute unit. Each SRAM can receive 192 bits from the broadcast block and output 192 bits to the 12-input dot product unit per clock cycle. That translates into feeding 12 elements per cycle at 16 bits per element. As an example, the row of the SRAM corresponding to address 0 (ADDR 0) is configured to store elements 0-0 through 0-11, which are the first 12 elements. At ADDR 1, another 12 elements are stored and so on. This example shows one packing strategy to feed multiple elements of a row per clock cycle. In this example, the SRAM uses only 21 rows, address 0 through address 20, and that's enough to store the entire square matrix. In this example, up to twenty-four 252 by 252 square matrices may be packed into the on-chip memory corresponding to node 600. Depending on the numeric precision of the weights, fewer or more matrices could be packed. As an example, an 8-bit mode may be used to pack up to 48 matrices of the same size as in the 16-bit mode. Indeed, other permutations can also be supported.

The 12-input dot product unit performs the compute, and thus, in this example, node 600 includes a vector multiply-addition tree. As an example, to perform a dot product operation, an element pair-wise multiply between each element of that row against each element of the vector may be performed and then summed up into one accumulated variable. In the example shown in FIG. 6, each of the tiles is responsible for computing one row of the matrix. On every clock cycle, 12 elements out of that matrix may be processed at a time. This example corresponds to 16-bit integer arithmetic (e.g., each weight is represented by 16 bits) and hence each SRAM entry is 512×192 bits. Other bit sizes may be used, including, for example, 1 bit, 2 bits, 4 bits, or 8 bits to represent the weights corresponding to the neural network mode.

With respect to the NFU's multifunction units (MFUs), they may perform several vector functions based on local and/or external data. An example MFU implementation may support pointwise addition, multiplication, sigmoid, and hyperbolic tangent functions, along with pass-through and memory management functionality. In one example, each MFU may be configured in a way that every operator (e.g., a hardware block for performing an operation) needed by every instruction type that an MFU can handle is provided in every MFU and is replicated along a chained path of multiple MFUs.

Figure 7:
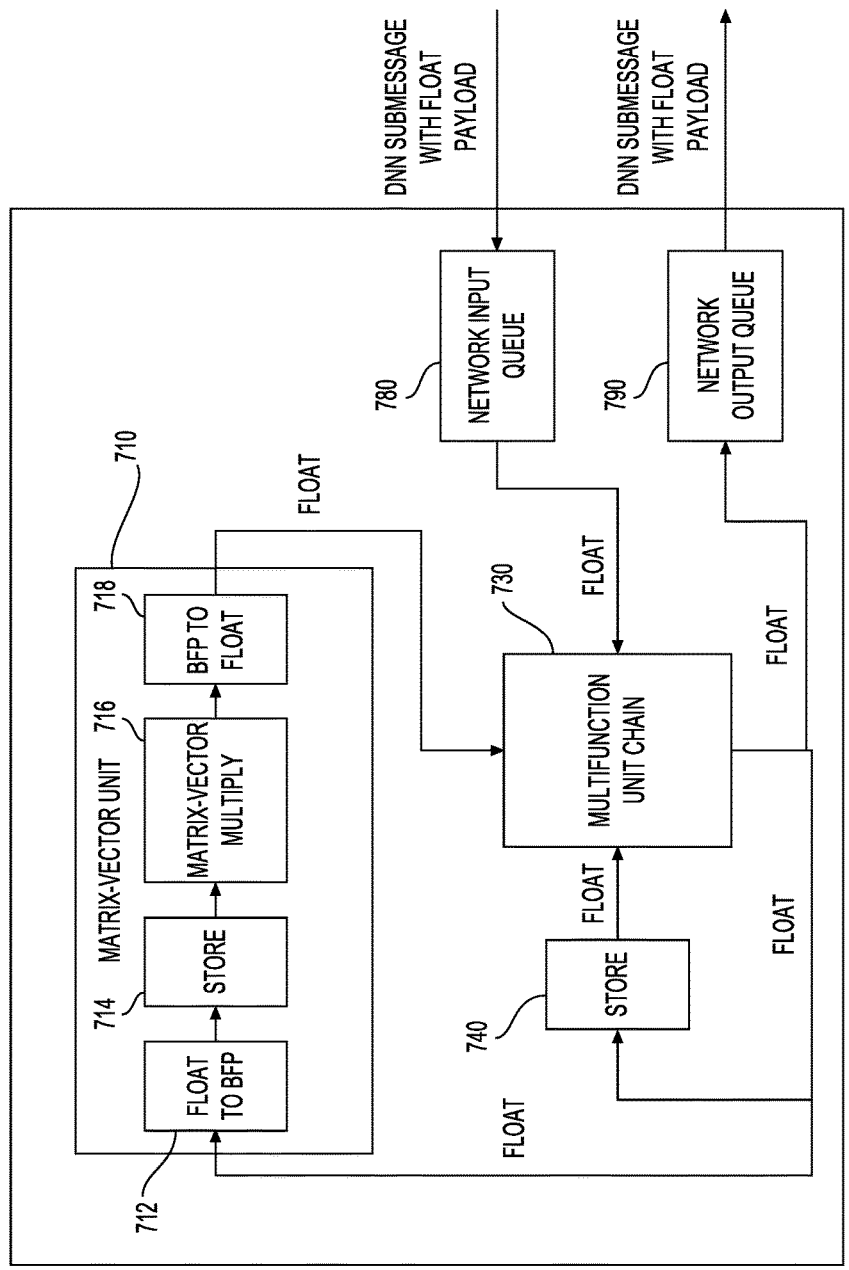
FIG. 7 shows a block diagram of a hardware node including a matrix vector unit in accordance with one example.

FIG. 7 shows a block diagram of a hardware node 700 including a matrix vector unit in accordance with one example. Hardware node 700 may receive neural network processing related messages (e.g., DNN sub-messages) and process them to provide output in the form of messages (e.g., DNN sub-messages). As explained earlier with respect to FIGS. 1-3, the messages may be received from other hardware nodes and may be transmitted to the other hardware nodes via a network. Hardware node 700 may include a matrix vector unit 710, a multifunction unit chain 730, a network input queue 780, and a network output queue 790. In this example, these may be arranged and interconnected in a manner shown in FIG. 7. Matrix vector unit 710 may further include a floating point (float) to block-floating point (BFP) block 712, a store 714, a matrix-vector multiply block 716, and a block-floating point (BFP) to a floating point (float) block 718.

Hardware node 700 may use three different number formats across different portions of its architecture as shown in FIG. 7. In one example, all high-level interfaces between modules may transfer vector data in floating point format (e.g., float16 or float32, which may be referred to in this figure as float). Matrix-vector multiply block 716 may receive vector data in BFP short format from the floating point (float) to block-floating point (BFP) block 712. This vector data may be placed into the on-chip memories (e.g., BRAMs) described with respect to FIGS. 5 and 6. In this example, matrix vector unit 710 may implement its I/O in floating point format, however it may make use of two internal BFP formats for expressing its input and output: BFP short, for vector and matrix storage, and BFP long for accumulation. In one example of matrix vector unit 710, BFP short may use q1.15 fixed point values with a shared 5 bit exponent, and BFP long may use q34.40 fixed point values with a shared 5 bit exponent. In this example, matrix-vector multiplication results in BFP long may be converted back to a floating point format as a final output stage. Although FIG. 7 shows a certain number of components of hardware node 700 arranged in a certain manner, there could be more or fewer number of components arranged differently.

Figure 8:
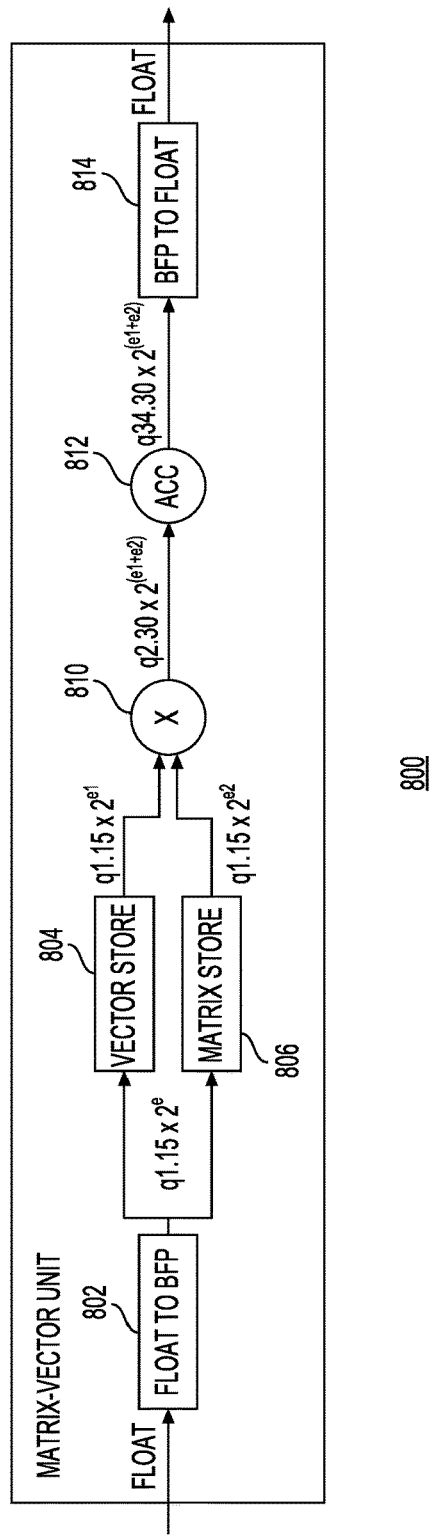
FIG. 8 shows a flow diagram of a method performed in a matrix vector unit in accordance with one example.

FIG. 8 shows a block diagram of a matrix vector unit 800 in accordance with one example. Matrix vector unit 800 may include a floating point (float) to block-floating point (BFP) block 802, a vector store 804, a matrix store 806, a multiplication block 810, an accumulation block 812, and a block-floating point (BFP) to floating point (float) block 814. In one example, which assumes that BFP short may use q1.15 fixed point values with a shared 5 bit exponent, and BFP long may use q34.30 fixed point values with a shared 5 bit exponent, the steps shown below in Table 3 may be performed as part of the conversion of the training vector data in the floating point format to the block-floating point format.

TABLE 3

1. Scan the values corresponding to the incoming vector data in the floating point format to find the maximum exponent ($\exp_{max}$)
2. For each floating point value, subtract the floating point value's exponent ($\exp_{float}$) from the maximum exponent ($\exp_{max}$), resulting in a delta exponent (($\exp_{delta}$) = ($\exp_{max}$) − ($\exp_{float}$))
3. Cast the significand (mantissa) bits for the floating point values (including sign and implied bits) from the sign-magnitude float value to 2s complement and pad or truncate it to match the bit-width of the BFP fixed point representation (q1.15)

TABLE 3-continued a. For float16 with a 11-bit significand (1-implied, 10-stored), convert to 2s complement representation and pad 4-lower bits of zeros to match the bit-width of the fixed point representation;
  b. For float32 with a 24-bit significand (1-implied, 23-stored), convert to 2s complement representation and truncate the 9-lower bits to match the width of the fixed point representation
4. Support sub-normals by handling the implied leading bit of the floating-point significand during assignment to fixed point
  a. When the exponent equals 0, set the implied leading bit to 0
  b. When the exponent does not equal 0, set the implied leading bit to 1
5. Perform arithmetic shifting of each of the fixed point values to the right by a magnitude specified by ($\exp_{shift}$) = (($\exp_{delta}$) + 1)). In this example, 1 may be used as an adjustment factor needed for q1.15 representation
  a. Sign-extend the leading sign bit during right shifting
  b. Drop the lower bits during right shifting
6. Pass the result along with the new calculated exponent ($\exp_{shift}$) to the output BFP interface Although Table 3 describes a certain way of determining a shared exponent for a set of values of the vector data, other ways may be used. For example, the shared exponent may be: (1) the maximum value of the exponents among the values in a block, (2) a certain percentile (e.g., the 95th percentile) of the exponents among the values in a block, or (3) an average value of the exponents among the values in the block. The block size may be the size of the entire matrix, a row of the matrix, or a portion of the row of the matrix. The block-floating point (BFP) values may be stored in vector store 804 and matrix store 806, respectively.

Multiplication block 810 may be used to perform a multiplication operation on the vector data and the matrix data from the respective stores. As an example, the steps shown below in Table 4 may be performed as part of the multiplication.

TABLE 4

1. Read the shared exponent of the input vector $e^1$ and shared exponent of the matrix $e^2$ and sum them to produce the shared exponent of the result vector
2. For each row r in the matrix:
  a. Take the product of each inputvector[c] and matrix[r][c]. (In this example, each element of those tensors is stored as a q1.15 value, so the
  result is a 32-bit q2.30 representation).
  b. Accumulate the 32-bit products into a 64-bit register (q34.30), in q34.30 BFP long representation
  c. Pass the result of the dot product in BFP long representation to the BFP to Float converter Once the result of the multiplication in BFP long representation has been received by the BFP to float block 814, this block may perform a series of steps to convert the result values from the BFP long format to the floating point representation. In one example, the steps shown in Table 5 may be performed.

TABLE 5

1. Discard the upper 17 and lower 15 bits of the q34.30 number to produce a q17.15 number representation. (In this example, the upper 17 bits are guaranteed to be zero because of the following: q1.15 numbers have a range of [−1:1), and taking the product of two q1.15 numbers produces a q2.30 number with range (−1:1]. In this example, the range of a sum of N of these products is (−N, N]).
2. For each incoming value, compute the normalization factor, norm = [$\log_2|x_i|$] − c (In this example, the constant c equals the number of significand bits (not including the implied bit), which equals 10 for float$_{16}$ format and 23 for float$_{32}$ format.
  a. For each BFP value (e.g., represented in the q17.15 BFP representation), compute the absolute value of $|x_i|$ TABLE 5-continued b. Calculate the position of the leading non-zero bit of the absolute value $[\log_2|x_i|]$
c. Check if the bits below the leading non-zero bit are non-zero and add to the value calculated in step b, $[\log_2|x_i|]$
3. For each of the 2s complement representation of the q17.15 fixed point value, cast the 2s complement representation to a sign-magnitude number and extend or truncate the bits to match the number of significand bits in the floating point representation
   a. For $float_{16}$, convert to 2s complement and truncate 4-lower bits to match the significand size of 11-bits (1-implied, 10-stored). (Alternatively, one may also choose to truncate post-scaling to retain precision for very small numbers)
   b. For $float_{32}$, convert to 2s complement and pad 9-lower bits to match the significand size of 24-bits (1-implied, 23-stored)
4. Normalize the sign-magnitude values from step 3 by performing arithmetic shifting
   a. During right shifting, sign-extend the leading sign bit and drop the lower bits
   b. During left shifting, keep sign bit and pad lower bits with 0
5. Pack the sign, exponent and significand bits into a float point representation and emit the resulting numbers as output[r]

As described above, the matrix-vector unit 800 performs the various conversions from the floating point format to the block-floating point format in-situ. This way the hardware node and the instructions or software used to perform the various operations need not be aware of this conversion. In other words, the instructions may specify operands in the floating point format and the hardware node including matrix-vector unit 800 may perform these conversions into fixed point format in the right places then dequantize back to the floating point format. As a result, other operators, such as softmax need not operate at a lower precision.

Although the above steps in Tables 3, 4, and 5 are described using certain number of exponent bits, significand bits, and other bit-widths, they need not be the ones in the tables. As an example, although the above example assumes the 2s complement representation of block-floating point numbers as q1.15 representation, fewer or more fixed point bits may be used. In addition, although the above example includes truncating $float_{32}$ bits during casting to lower precision q1.15 fixed point representation, this need not be done; instead, various rounding modes may be used to improve accuracy. Although FIG. 8 shows a certain number of components of matrix vector unit 800 arranged in a certain manner, there could be more or fewer number of components arranged differently. In addition, although the steps in Table 3, 4, and 5 are described in the context of matrix vector multiplication operations, these steps may also be performed when performing other types of operations, including convolutions, image filtering, regression, or other machine language operations.

Figure 9:
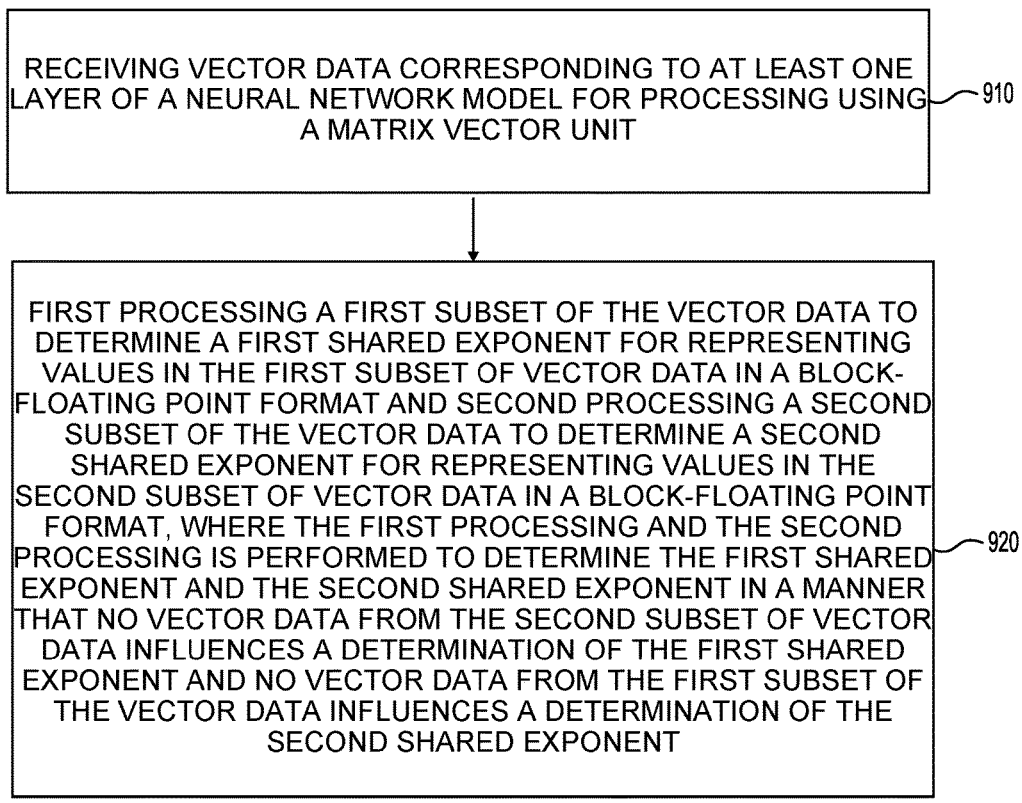
FIG. 9 shows a flow diagram of a method in accordance with one example.

FIG. 9 shows a flow diagram 900 of a method for processing instructions in accordance with one example. The method may include a step (e.g., step 910) including receiving training data corresponding to at least one layer of neural network model for processing using a matrix vector unit. As explained earlier, the training data may be received via a network coupling the various hardware nodes. Moreover, each hardware node may include input message queue(s) to receive the vector data.

The method may further include a step (e.g., step 920) including first processing a first subset of the training vector data to determine a first shared exponent for representing values in the first subset of the training vector data in a block-floating point format and second processing a second subset of the training vector data to determine a second shared exponent for representing values in the second subset of the training vector data in a block-floating point format, where the first processing and the second processing is performed to determine the first shared exponent and the second shared exponent in a manner that no vector data from the second subset of the training vector data influences a determination of the first shared exponent and no vector data from the first subset of the training vector data influences a determination of the second shared exponent. Step 920 may be performed a matrix vector unit (e.g., as depicted in FIG. 8), including, in one example, the process described via Tables 3, 4, and 5.

In conclusion, the present disclosure relates to a method in a processor including a matrix vector unit. In one example, the method may include receiving vector data corresponding to at least one layer of a neural network model for processing using the matrix vector unit, where each of the vector data has a value represented in a format comprising at least one exponent. The method may further include first processing a first subset of the vector data to determine a first shared exponent for representing values in the first subset of the vector data in a block-floating point format and second processing a second subset of the vector data to determine a second shared exponent for representing values in the second subset of the vector data in a block-floating point format, where the first processing and the second processing is performed to determine the first shared exponent and the second shared exponent in a manner that no vector data from the second subset of the vector data influences a determination of the first shared exponent and no vector data from the first subset of the vector data influences a determination of the second shared exponent.

The method may further include receiving input vector data, where each of the input vector data has a value represented in a format comprising an input vector exponent and performing a first multiplication operation on the first subset of the vector data using the first shared exponent and the input vector exponent, and performing a second multiplication operation on the second subset of the vector data using the second shared exponent and the input vector exponent. The method may further include accumulating any result data from the first multiplication operation and the second multiplication operation in an accumulator in a block-floating point format and converting the result data from the block-floating point format to a floating point format and outputting converted data from the matrix vector unit in the floating point format.

The first processing may further include determining a first exponent having a largest value among exponents corresponding to values of the first subset of the vector data, and the second processing may further include determining a second exponent having a largest value among exponents corresponding to values of the second subset of the vector data. The vector data may comprise an N by M matrix of vector data, where each of N and M is an integer greater than 1, and where each of the first subset and the second subset comprises a row of the N by M matrix of vector data or a portion of a row of the N by M matrix of vector data. The size of the first shared exponent may be different from a size of the second shared exponent.

In another example, the present disclosure relates to a processor configured to receive vector data corresponding to at least one layer of a neural network model for processing using the matrix vector unit, where each of the vector data has a value represented in a format comprising at least one exponent. The processor is further configured to first process a first subset of the vector data to determine a first shared exponent for representing values in the first subset of the vector data in a block-floating point format and second process a second subset of the vector data to determine a second shared exponent for representing values in the second subset of the vector data in a block-floating point format, where the processor is further configured to determine the first shared exponent and the second shared exponent in a manner that no vector data from the second subset of the vector data influences a determination of the first shared exponent and no vector data from the first subset of the vector data influences a determination of the second shared exponent.

The processor may further be configured to receive input vector data, where each of the input vector data has a value represented in a format comprising an input vector exponent. The processor may further be configured to perform a first multiplication operation on the first subset of the vector data using the first shared exponent and the input vector exponent, and perform a second multiplication operation on the second subset of the vector data using the second shared exponent and the input vector exponent.

The processor may further include an accumulator to accumulate any result data from the first multiplication operation and the second multiplication operation in a block-floating point format. The processor may further be configured to convert the result data from the block-floating point format to a floating point format and output converted data from the matrix vector unit in the floating point format. The processor may further be configured to determine a first exponent having a largest value among exponents corresponding to values of the first subset of the vector data, and determine a second exponent having a largest value among exponents corresponding to values of the second subset of the vector data. The vector data may comprise an N by M matrix of vector data, where each of N and M is an integer greater than 1, and where each of the first subset and the second subset comprises a row of the N by M matrix of vector data or a portion of a row of the N by M matrix of vector data. The size of the first shared exponent may be different from a size of the second shared exponent.

In yet another example, the present disclosure relates to a system including an input message processor configured to process incoming messages, where the input message processor is further configured to split the incoming messages into a first set of messages and a second set of messages. The system may further include a scalar processor configured to process the first set of messages. The system may further include a neural function unit configured to process instructions placed in a plurality of queues by the scalar processor on input data received at least via the second set of messages. The neural function unit may include a pipeline configured to process instructions, the pipeline including a matrix vector unit, a first multifunction unit, where the first multifunction unit is connected to receive an input from the matrix vector unit, a second multifunction unit, where the second multifunction unit is connected to receive an output from the first multifunction unit, and a third multifunction unit, where the third multifunction unit is connected to receive an output from the second multifunction unit. The matrix vector unit may be configured to receive training vector data corresponding to at least one layer of a neural network model for processing using the matrix vector unit, where each of the training vector data has a value represented in a format comprising at least one exponent. The matrix vector unit may further be configured to first process a first subset of the training vector data to determine a first shared exponent for representing values in the first subset of the training vector data in a block-floating point format and second process a second subset of the training vector data to determine a second shared exponent for representing values in the second subset of the training vector data in a block-floating point format, where the processor is further configured to determine the first shared exponent and the second shared exponent in a manner that no vector data from the second subset of the training vector data influences a determination of the first shared exponent and no vector data from the first subset of the training vector data influences a determination of the second shared exponent.

The matrix vector unit may further be configured to receive input vector data, wherein each of the input vector data has a value represented in a format comprising an input vector exponent. The matrix vector unit may further be configured to perform a first multiplication operation on the first subset of the vector data using the first shared exponent and the input vector exponent, and perform a second multiplication operation on the second subset of the vector data using the second shared exponent and the input vector exponent. The matrix vector unit may further include an accumulator to accumulate any result data from the first multiplication operation and the second multiplication operation in a block-floating point format.

The matrix vector unit may further be configured to convert the result data from the block-floating point format to a floating point format and output converted data from the matrix vector unit in the floating point format. The matrix vector unit may further be configured to determine a first exponent having a largest value among exponents corresponding to values of the first subset of the training vector data, and determine a second exponent having a largest value among exponents corresponding to values of the second subset of the training vector data. The training vector data may comprise an N by M matrix of vector data, where each of N and M is an integer greater than 1, and where each of the first subset and the second subset comprises a row of the N by M matrix of vector data or a portion of a row of the N by M matrix of vector data.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
an input message processor configured to process incoming messages, wherein the input message processor is further configured to split the incoming messages into a first set of messages and a second set of messages;
a scalar processor configured to process the first set of messages; and
a neural function unit configured to process instructions placed in a plurality of queues by the scalar processor on input data received at least via the second set of messages, the neural function unit comprising:
a pipeline configured to process instructions, the pipeline including a matrix vector unit, a first multifunction unit, wherein the first multifunction unit is connected to receive an input from the matrix vector unit, a second multifunction unit, wherein the second multifunction unit is connected to receive an output from the first multifunction unit, and a third multifunction unit, wherein the third multifunction unit is connected to receive an output from the second multifunction unit, and wherein the matrix vector unit is further configured to:
receive training vector data corresponding to at least one layer of a neural network model for processing using the matrix vector unit, wherein each of the training vector data has a value represented in a format comprising at least one exponent, and
first process a first subset of the training vector data to determine a first shared exponent for representing values in the first subset of the training vector data in a block-floating point format and second process a second subset of the training vector data to determine a second shared exponent for representing values in the second subset of the training vector data in a block-floating point format, wherein the processor is further configured to determine the first shared exponent and the second shared exponent in a manner that no vector data from the second subset of the training vector data influences a determination of the first shared exponent and no vector data from the first subset of the training vector data influences a determination of the second shared exponent.

2. The system of claim 1, wherein the matrix vector unit is further configured to:
receive input vector data, wherein each of the input vector data has a value represented in a format comprising an input vector exponent; and
perform a first multiplication operation on the first subset of the vector data using the first shared exponent and the input vector exponent, and perform a second multiplication operation on the second subset of the vector data using the second shared exponent and the input vector exponent.

3. The system of claim 2, wherein the matrix vector unit further comprises an accumulator to accumulate any result data from the first multiplication operation and the second multiplication operation in a block-floating point format.

4. The system of claim 3, wherein the matrix vector unit is further configured to convert the result data from the block-floating point format to a floating point format and output converted data from the matrix vector unit in the floating point format.

5. The system of claim 1, wherein the matrix vector unit is further configured to determine a first exponent having a largest value among exponents corresponding to values of the first subset of the training vector data, and determine a second exponent having a largest value among exponents corresponding to values of the second subset of the training vector data.

6. The system of claim 1, wherein the training vector data comprises an N by M matrix of vector data, wherein each of N and M is an integer greater than 1, and wherein each of the first subset and the second subset comprises a row of the N by M matrix of vector data or a portion of a row of the N by M matrix of vector data.

7. A processor configured to:
receive vector data corresponding to at least one layer of a neural network model for processing using the matrix vector unit, wherein each of the vector data has a value represented in a format comprising at least one exponent; and
first process a first subset of the vector data to determine a first shared exponent for representing values in the first subset of the vector data in a block-floating point format and second process a second subset of the vector data to determine a second shared exponent for representing values in the second subset of the vector data in a block-floating point format, wherein the processor is further configured to determine the first shared exponent and the second shared exponent in a manner that no vector data from the second subset of the vector data influences a determination of the first shared exponent and no vector data from the first subset of the vector data influences a determination of the second shared exponent.

8. The processor of claim 7 further configured to:
receive input vector data, wherein each of the input vector data has a value represented in a format comprising an input vector exponent; and
perform a first multiplication operation on the first subset of the vector data using the first shared exponent and the input vector exponent, and perform a second multiplication operation on the second subset of the vector data using the second shared exponent and the input vector exponent.

9. The processor of claim 8 further comprising an accumulator to accumulate any result data from the first multiplication operation and the second multiplication operation in a block-floating point format.

10. The processor of claim 9 further configured to convert the result data from the block-floating point format to a floating point format and output converted data from the matrix vector unit in the floating point format.

11. The processor of claim 7, wherein the processor is further configured to determine a first exponent having a largest value among exponents corresponding to values of the first subset of the vector data, and determine a second exponent having a largest value among exponents corresponding to values of the second subset of the vector data.

12. The processor of claim 7, wherein the vector data comprises an N by M matrix of vector data, wherein each of N and M is an integer greater than 1, and wherein each of the first subset and the second subset comprises a row of the N by M matrix of vector data or a portion of a row of the N by M matrix of vector data.

13. The processor of claim 7, wherein a size of the first shared exponent is different from a size of the second shared exponent.

14. A method in a processor including a matrix vector unit, the method comprising:
receiving vector data corresponding to at least one layer of a neural network model for processing using the matrix vector unit, wherein each of the vector data has a value represented in a format comprising at least one exponent; and
first processing a first subset of the vector data to determine a first shared exponent for representing values in the first subset of the vector data in a block-floating point format and second processing a second subset of the vector data to determine a second shared exponent for representing values in the second subset of the vector data in a block-floating point format, wherein the first processing and the second processing is performed to determine the first shared exponent and the second shared exponent in a manner that no vector data from the second subset of the vector data influences a determination of the first shared exponent and no vector data from the first subset of the vector data influences a determination of the second shared exponent.

15. The method of claim 14 further comprising:
receiving input vector data, wherein each of the input vector data has a value represented in a format comprising an input vector exponent; and
performing a first multiplication operation on the first subset of the vector data using the first shared exponent and the input vector exponent, and performing a second multiplication operation on the second subset of the vector data using the second shared exponent and the input vector exponent.

16. The method of claim 15 further comprising accumulating any result data from the first multiplication operation and the second multiplication operation in an accumulator in a block-floating point format.

17. The method of claim 16 further comprising converting the result data from the block-floating point format to a floating point format and outputting converted data from the matrix vector unit in the floating point format.

18. The method of claim 14, wherein the first processing further comprises determining a first exponent having a largest value among exponents corresponding to values of the first subset of the vector data, and wherein the second processing further comprises determining a second exponent having a largest value among exponents corresponding to values of the second subset of the vector data.

19. The method of claim 14, wherein the vector data comprises an N by M matrix of vector data, wherein each of N and M is an integer greater than 1, and wherein each of the first subset and the second subset comprises a row of the N by M matrix of vector data or a portion of a row of the N by M matrix of vector data.

20. The method of claim 14, wherein a size of the first shared exponent is different from a size of the second shared exponent.

* * * * *